June 29, 1926.  
J. BROUWER  
1,590,881

WIDTHING MACHINE FOR PLANKS AND LATHS

Filed Dec. 16, 1924

Inventor  
J. Brouwer

Patented June 29, 1926.

1,590,881

UNITED STATES PATENT OFFICE.

JACOBUS BROUWER, OF ROTTERDAM, NETHERLANDS, ASSIGNOR TO NAAMLOOZE VENNOOTSCHAP ARNOLD I. van den BERGH'S EMBALLAGE FABRIEKEN, OF ROTTERDAM, NETHERLANDS, A DUTCH COMPANY.

WIDTHING MACHINE FOR PLANKS AND LATHS.

Application filed December 16, 1924, Serial No. 756,297, and in Holland December 18, 1923.

This invention has for its object a widthing machine for planks and laths and which is specially adapted for cooperating with a sawing machine for cutting wood beams or deals into planks. If desired, the novel machine can be combined with the sawing machine to form a unit therewith, for instance, by mounting both the widthing machine and the sawing machine on a common base.

The invention will be set forth hereinafter with reference to the following description of the embodiment shown, by way of example only, on the annexed drawing.

Figure 1:
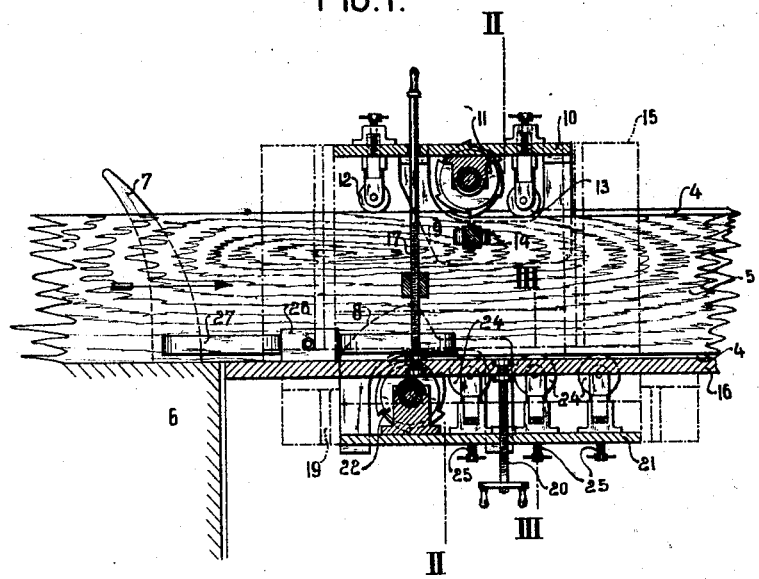
Figure 2:
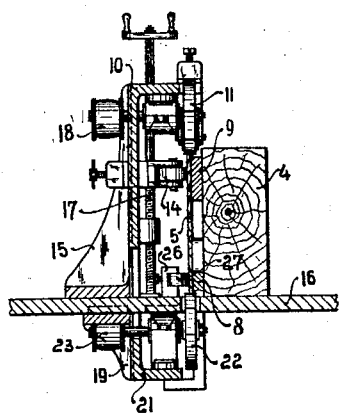
Figure 3:
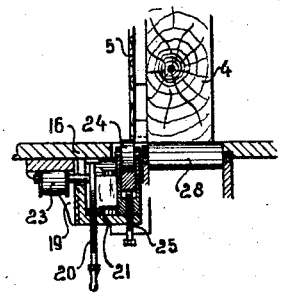

Fig. 1 of the drawing is a vertical, longitudinal section of the widthing machine and Figs. 2 and 3 are cross sections along the lines II—II and III—III in Fig. 1, respectively.

From the wood beam or other suitable piece of timber 4 a plank 5 has been split in the sawing machine 6. The plank is laterally diverted from the beam in the usual manner by means of a division or fence 7 and is further guided by an additional fence composed of two parts, the one of which, designated by 8, is rigidly secured to the framing, whereas the other part, 9, is secured to a slide 10 adapted for vertical adjustment. Slide 10 is provided with a bearing for the spindle of a revolving cutter 11 and it further serves as a support both for spring loaded pressure rollers 12, 13 engaging the top edge of plank 5 and for a spring loaded horizontal pressure roller, which maintains the plank and the part 9 of the fence 8, 9 in contact. The downward pressure exerted by these rollers can be adjusted in the usual manner by means of screws. The slide 10 is mounted in a bracket 15 bolted to the table 16, to which is also secured the fence part 8, a screw spindle 17 serving to adjust the said slide in vertical direction. The revolving cutter 11 is driven by a pulley 18.

It will be understood, that the parts associated with slide 10 should be adjusted in accordance both with the width of the plank coming from the sawing machine and with the thickness of the cutting to be taken off by the cutter operating on the top edge of the plank.

Underneath the table 16, which will hereinafter be referred to as the guideway for the body portion of the wood beam, is a bracket 19 for a second slide 21, which is vertically adjustable by means of a screw spindle 20. The slide 21 is provided with a bearing for the spindle of a revolving cutter 22 driven by a pulley 23, and also with three counter-pressure rollers 24, which are adjustable, by screws 25, in a vertical direction relative to the slide, but which are not spring loaded. Bolted to the guideway 16 for the body portion of the beam is a bracket 26 for a spring blade 27, which maintains the lower portion of the plank in contact with the fixed fence 8.

The counter-pressure rollers 24 should be adjusted in accordance with the diameter of the cutter 22 and further together with said cutter, in accordance with the desired depth of cut.

The operation of the machine will be readily understood from the foregoing description. The comparatively flexible plank is pressed against the fence 8, 9 near the points where it is operated upon by the revolving cutters, said cutters acting to ensure a uniform width of the plank which, during this operation, is kept down by the pressure rollers 12 and 13. The beam 4 continues its travel over guide rollers 28 without, however, being pressed down. Consequently, the uniform feed motion of the flexible plank between its rollers and the fence is not affected by any warp or twist of the beam and the plank is free to divert from the path prescribed to it by the body portion of the beam. Owing to this independent control of the motion of the plank, a uniform width throughout the length of even seriously warped or twisted planks can be ensured with a minimum of cutting being taken off. This is a great advantage in the manufacture of boards for boxes because, while long bends in the plank are hardly noticeable in the relatively short boards cut off from the plank, it is essential to cut the wood as economically as possible.

If desired, an additional revolving cutter or a fixed planing iron could be provided for planing the plank on the side away from the support (fence 8, 9). The first plank cut from the beam has, as a rule, an unsightly outer face, so that for certain purposes, for instance, in the manufacture of boxes, it is necessary for said face to be wrought in a separate machine, whereas the smoothly cut faces need not be planed again. With the novel machine, said planing can be done while the plank comes from the sawing machine.

If desired, the novel machine can be provided with an auxiliary feed roller to relieve the feed roller of the sawing machine and to prevent the plank from collapsing.

Another and still more important feature of the new method of widthing the plank while it comes from the sawing machine is, that in the manufacture of boxes and the like one operation is saved. Up till now a number of small boards cut from the planks are assembled to form a packet and are passed between two saws which cut them to the desired width. With the new machine, this stage in the manufacture is combined with the cutting of the beam into planks, whereby a saving in floor space, capital expenditure, wages and transport is realized and the waste is not, as is the case with a ripping saw, in the form of small slats or laths which, as is known, are difficult to get rid of. The short cuttings produced by the new machine are easy to transport with known means, i. e. by suction. Another advantage of the present invention is, that the dangerous ripping saw can altogether be done away with.

By "widthing" of the plank are also to be understood operations, such as moulding, grooving and tongueing, which can be carried out, with a minimum of expense, simultaneously with the splitting of the plank from the beam.

Although by the presence of two opposite cutter block spindles the novel machine has a certain resemblance with ordinary three or four sided planing machines, a distinct difference from the prior art is the provision of an individual guideway, near one side of the special fence, for the body portion of the wood beam and the fact, that the other side of the fence serves as a support for the plank during the time the edges of the plank are operated upon.

Even when the pressure means and the cutter blocks shown on the drawing are replaced by other, or otherwise formed elements, so that the general arrangement of the machine is more like that of ordinary planing machines and the plank is supported with its side on a horizontally disposed division or fence, a characteristic feature of the novel machine is the presence of the extra guideway or path at the other side of said support. When the side of the plank is horizontal, the guideway for the body portion of the wood beam is, as will be understood, not at right angles to the fence 8, 9, but in parallel relation therewith.

For sawing thin planks it is preferred to use a conical circular saw with non-set teeth, so that the width of cut is a minimum and a smooth finishing cut is ensured.

A typical feature of the machine illustrated, by way of example, on the annexed drawing is, that the support for the plank, i. e. the fence 8, 9, mounted as usual behind the sawing machine, is disposed vertically and that horizontal guideways are provided on either side of said support. In this embodiment of the invention there are two horizontal cutter block spindles. This general arrangement differs from that of any prior wood-working machine.

In view of the comparatively small thickness of the support (fence 8, 9) for the plank and of the fact, that the machine is devised for work pieces of different widths, the composition of the fence of a fixed part and of an adjustable part is another valuable feature of the invention. Said support could, however, be an integral piece not operatively coupled with other elements.

The arrangement, whereby the elements for keeping the plank down and those for cutting one edge thereof can be adjusted simultaneously is also an important feature of the invention, because it allows of quickly adapting the machine for another width of the plank to be cut.

For discriminating a machine according to this invention it suffices to make sure whether the machine is provided, in combination with normal parts for wood-working machine of this character, with spindles obviously destined for carrying cutter blocks, because such machines are often sold without cutter blocks.

It is evident that the exact construction of the sawing machine for splitting the plank from the beam is to a certain extent immaterial as far as the invention is concerned, but the combination of the novel machine with a sawing machine of any suitable type is of importance.

Wherever this specification refers to planks and beams, it also applies to boards, laths, strips, etc., and to logs, broad timbers, deals, etc., respectively.

What I claim is:—

1. A smoothing machine for planing, milling or boring the narrow edges of a thin board as it passes with a main piece of timber from a sawing machine, including a frame forming a guideway for the main piece of timber, cutter and pressure tools mounted on the frame, and a pair of guiding elements mounted on the frame and positioned between the main piece of timber and the thin board which has been cut therefrom for coacting with cutter and pressure tools, substantially as and for the purposes set forth.

2. A machine in accordance with claim 1, wherein the guiding elements are positioned so as to contact with the outer parts of the width surface of the thin board.

3. A machine in accordance with claim 1, wherein one of the guiding elements is stationary and the other is vertically adjustable with respect thereto.

4. A machine in accordance with claim 1, wherein certain of the cutter and pressure tools and one of the guiding elements are stationary, and the remaining element and cutter and pressure tools are adjustable vertically with respect thereto.

5. A machine in accordance with claim 1, wherein the two guiding elements are displaced relatively to each other in the longitudinal direction of the board, and means for adjustably mounting one of the elements relatively to the other in a vertical direction so that the said guiding elements can pass each other when guiding relatively narrow boards.

6. A smoothing machine for planing, milling or boring the narrow edges of a thin board as it passes from a sawing machine with the main piece of timber from which it is being cut including in combination, a frame forming a guideway for the timber and the board, cutter and pressure tools mounted on the frame for engaging one of the edges of the board to the cutter and pressure tools adjustably mounted relative to the frame for engaging the opposite edge of the board, pressure elements on the frame for engaging the outside surface of the thin board, a pair of guiding elements arranged between the board and the main piece of timber and one of which is stationary while the other is movable with the movable cutter and pressure tools relative to the first guiding element, and said guiding elements being somewhat relatively displaced in the longitudinal direction of the board and provided with adjacent beveled edges to permit of the guiding of narrow boards, substantially as and for the purposes set forth.

In testimony whereof I affix my signature.

JACOBUS BROUWER.